United States Patent [19]

Lovaas

[11] Patent Number: 4,832,395
[45] Date of Patent: May 23, 1989

[54] VEHICLE BED COVER ASSEMBLY WITH LATERALLY ADJUSTABLE SLIDERS

[75] Inventor: Ann B. Lovaas, Brooksville, Fla.

[73] Assignee: ABL Unlimited, Inc., Homosassa, Fla.

[21] Appl. No.: 159,184

[22] Filed: Feb. 23, 1988

Related U.S. Application Data

[63] Continuation-in-part of Ser. No. 69,323, Jul. 2, 1987, Pat. No. 4,770,461, which is a continuation-in-part of Ser. No. 36,987, Apr. 10, 1987, Pat. No. 4,741,570, which is a continuation-in-part of Ser. No. 933,483, Nov. 21, 1986, abandoned.

[51] Int. Cl.$^4$ .............................................. B60J 7/00
[52] U.S. Cl. ..................................... 296/100; 296/105
[58] Field of Search .................. 296/100, 216; 49/234, 49/235; 160/193

[56] References Cited

U.S. PATENT DOCUMENTS

| | | | |
|---|---|---|---|
| 2,853,430 | 9/1958 | Hershberger | 296/100 |
| 3,165,352 | 1/1965 | Hallock et al. | 296/100 |
| 3,342,523 | 9/1967 | Lutgen | 296/100 |
| 3,640,565 | 2/1972 | Anderson | 296/100 |
| 4,068,886 | 1/1978 | Gostomski | 296/100 |

Primary Examiner—Robert R. Song
Attorney, Agent, or Firm—Pettis & Mc Donald

[57] ABSTRACT

A cover assembly for vehicle bed cover includes a plurality of rigid, telescoping cover members longitudinally movable and guide tracks mounted along the side of the vehicle bed with respective cover members extending over the front and rear ends of the vehicle bed for selectively exposing either the front portion or the rear portion of the bed or, both such portions. There are at least two support slide assemblies carried by each cover member with one of the slide assemblies engaging each guide track to provide sliding support to the longitudinal movement of the cover member. Each slide assembly is laterally adjustably mounted to the cover so that the slide assembly may be laterally adjusted for receipt by a respective guide track.

8 Claims, 1 Drawing Sheet

U.S. Patent  May 23, 1989  4,832,395
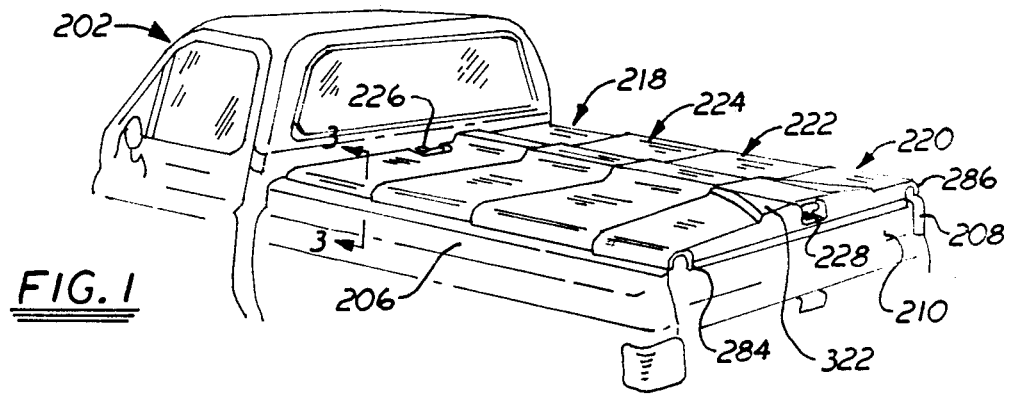
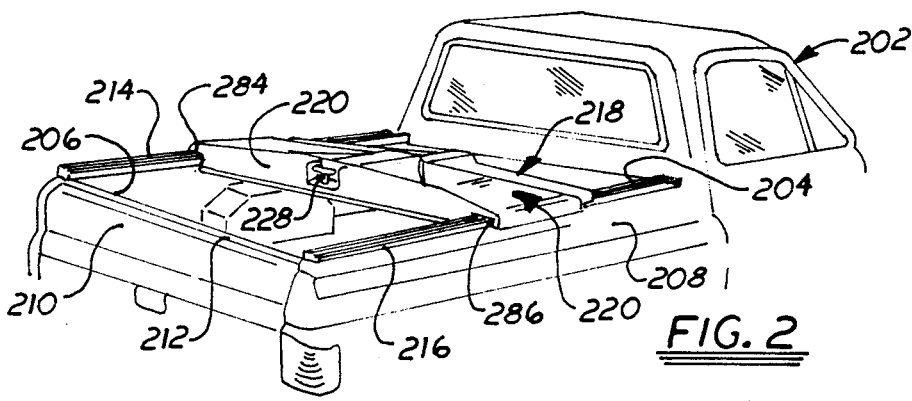
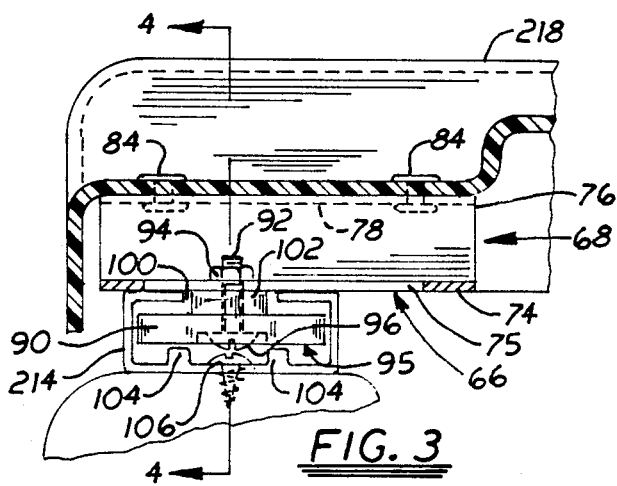
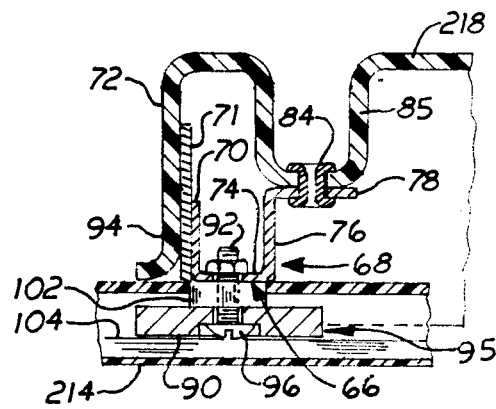
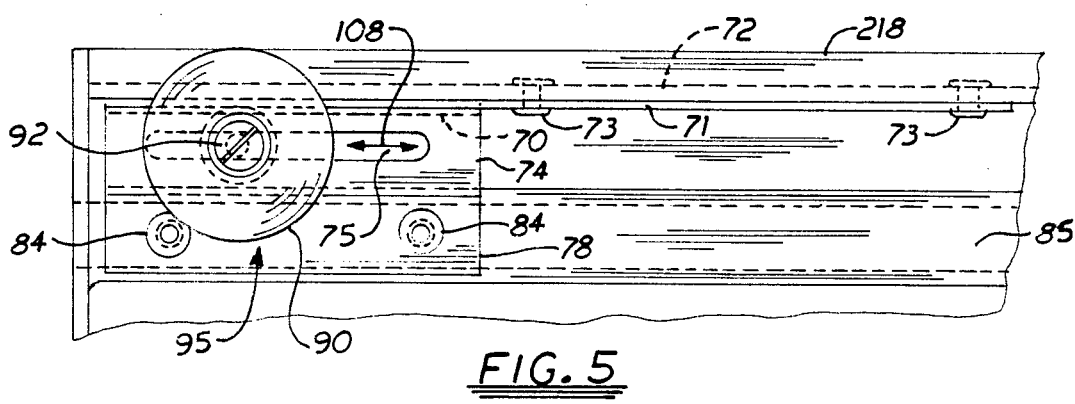

4,832,395

VEHICLE BED COVER ASSEMBLY WITH LATERALLY ADJUSTABLE SLIDERS

RELATED APPLICATIONS

This application is a continuation-in-part of application Ser. No. 069,323, filed July 2, 1987, U.S. Pat. No. 4,770,461, which application is continuation-in-part of application Ser. No. 036,987, filed Apr. 10, 1987, U.S. Pat. No. 4,741,570 which application is a continuation-in-part of application Ser. No. 933,483, filed Nov. 21, 1986, and now abandoned.

BACKGROUND OF INVENTION

This invention relates to the field of cover assemblies for vehicles having open beds, such as pickup trucks or similar vehicles. More particularly this invention relates to the field of substantially rigid covers for such vehicles, which covers are formed from a plurality of relatively movable segments. Still more particularly this invention relates to such covers that include slide assemblies which engage guide tracks mounted adjacent and longitudinally parallel to lateral sides of the vehicle bed.

Various types of vehicle bed cover assemblies have been known in the past. These have included flexible covers affixed by snaps or other fasteners along the uppermost extremities of the sides of the vehicle bed, rigid cover hingedly attached to the vehicle bed and various types of sliding and telescoping covers. Exemplary of the rigid telescoping cover assemblies of the prior art is U.S. Pat. No. 3,640,565 to Anderson. In this prior art patent a forward segment of the cover assembly is rigidly affixed to the forward portion of the vehicle and a rear section is slidably movable between an extended position covering the vehicle bed in a retractable position beneath the fixed segment. While such a prior art device provides several improvements over the soft type of covers or hinged covers, it has provided substantial inconvenience in blocking access to the forward portion of the vehicle bed. Moreover, conventional telescoping covers having close fits between adjacent cover members can jam and be difficult to open. Other such covers have unduly large gaps between the adjoining members and admit dirt and debris and cause the cover members to rattle.

I have previously disclosed a number of vehicle bed cover assemblies that overcome the above difficulties. In particular, see U.S. Ser. Nos. 036,987 and 069,323, both of this are fully incorporated herein by reference. Although these assemblies provide for significantly improved results, I have further recognized that a need exists for a cover assembly that is adjustable to engage vehicle beds of varying widths. Conventional covers typically employ slide assemblies that are fixed in place on the cover. These slide assemblies engage guide tracks mounted adjacent and longitudinally parallel to the side of the vehicle bed, thereby permitting the cover members to slide longitudinally along the bed. Such fixed sliders are often acceptable for a standard vehicle bed width. However, to insure a proper fit they must be precisely attached to the cover at proper locations. Moreover, certain vehicle beds may deviate from this standard width and, as a result, may not accept the fixed slide assemblies. Additionally, if the guide tracks are not installed substantially parallel on the side of the vehicle bed, conventional fixed sliders may not fit properly in the track.

SUMMARY OF THE INVENTION

To overcome various of the disadvantages of the prior art cover assemblies noted above it is an object of the present invention to provide such a cover assembly that may be slidably openable from either the front and/or the rear end of the vehicle bed. It is another object of this invention to provide such a cover assembly in which at least certain of the segments are positionable in any of the plurality of the positions selectively covering the front or rear portions of the vehicle bed, or both such front or rear portions. A further object of this invention is to provide a slidable cover assembly that is laterally adjustable for use with vehicle beds having various widths. Additionally, it is an object of this invention to provide for vehicle bed cover sliders that are permit the cover assembly to be properly mounted in the guide tracks regardless of lateral deviations in the guide track.

To provide these and other objects that will become apparent to those skilled in the art the present invention provides a telescoping cover assembly formed of a plurality of substantially rigid cover members. A pair of guide tracks are provided guiding longitudinal movement of the cover members. Each of the cover members extend transversely beyond longitudinal edges of the vehicle bed, and each longitudinally overlaps and is longitudinally moveable relative to another, with the first such cover member being releasably fixable in a position covering the front of the vehicle bed and a second cover member being positionable in any of a plurality of preselected positions completely covering or exposing preselected portions of the rear of the bed. One each of the guide tracks is fixed to the vehicle adjacent and longitudinally parallel to each lateral side of the vehicle for guiding longitudinal movement of the cover members. Affixed to each such cover member are at least two support slide assemblies with one each of the support slide assemblies engaging each such guide member to provide sliding support for the longitudinal movement of the cover member. Portions of the slide assemblies are laterally adjustably mounted to the cover member so that each slide assembly may be laterally adjusted for receipt by a respective guide track.

DESCRIPTION OF THE DRAWINGS

A preferred embodiment of the apparatus of this invention will be described in detail below in conjunction with the drawings in which:

FIG. 1 is a perspective view of one preferred embodiment of the vehicle bed cover assembly of this invention installed in a pickup truck type vehicle, with the cover members shown in the extended, bed covering closed position;

FIG. 2 is a perspective view of the cover assembly of FIG. 1. in which the individual cover members are telescopically collapsed to uncover selected portions of the vehicle bed;

FIG. 3 is a cross-sectional view taken along line 3—3 of FIG. 1, illustrating a guide track mounted to the longitudinal side of the vehicle bed and a representative slide assembly that is engaged with the guide track and laterally adjustably mounted to the cover member.

FIG. 4 is a cross-sectional view of the slide assembly and guide track taken along line 4—4 of FIG. 3 with the upper side of the guide track cut away to show the shoulder of the slide assembly; and FIG. 5 is a fragmentary bottom view of the laterally adjustable slide assembly.

DETAILED DESCRIPTION OF PREFERRED EMBODIMENT

One preferred embodiment of the telescoping vehicle bed cover assembly of this invention is illustrated in the perspective views of FIGS. 1 and 2. FIG. 1 illustrates the telescoping vehicle bed cover assembly of this invention as installed on a typical vehicle 202 such as a pickup truck. This pickup truck 202 includes an open bed having a front side 204, two generally parallel lateral sides 206 and 208 and a hinged rear gate 210. This rear gate 210 extends between lateral sides 206 and 208 and includes an upper edge 212 and, spaced thereof, a lower edge (not shown) hingedly attached to the vehicle.

As shown most clearly in FIG. 2, the telescoping cover assembly of this apparatus includes a pair of guide tracks 214 and 216, described in greater detail below, each affixed to the vehicle adjacent and longitudinally parallel to the respective lateral sides 206 and 208 of the vehicle bed. These guide tracks 214 and 216 provide for guiding longitudinal movement of the individual cover members. The cover members include a first cover member 218, shown in FIG. 1 covering the front portion of the vehicle bed, a second cover member 220, shown in FIG. 1 covering the rear portion of the vehicle and intermediate cover members 222 and 224. While the illustrated embodiment includes a total of four cover member, it is to be understood that the apparatus of this invention may include any number of such cover members greater than one, depending largely upon the length of the vehicle bed to be covered. Practical considerations and fabrication techniques and material strength will largely determine the number of such cover members to be utilized for a given length of bed. These cover members 218, 220, 222 and 224 may be formed of any suitable, substantially rigid material, such as metal or synthetic resins. Conveniently, the cover members may be formed by injection molding or by vacuum forming of a synthetic resin such as ABS (acrylonitrile-butadiene-styrene) or polypropylene or by lay-up of glass fiber matting and corresponding appropriate resins.

As shown in FIGS. 1 and 2, each adjacent pair 220 and 222, 222 and 224, and 218 and 224 of such cover members is configured such that one adjacent cover member is telescopically receivable under the other adjacent cover member. In particular, first cover member 218 is received under cover member 224; cover member 224 is received under cover member 222; and cover member 222 is received under the second cover member 220. This permits the telescopic retraction or collapsing of the cover members shown in FIG. 2 to uncover most of the vehicle bed for access. In alternative embodiments each rearward cover member may be telescopically receivable beneath the adjacent forward member.

First cover member 218 is provided with releasable latching means, of which the actuating handle 226 is shown in FIGS. 1 and 2. The first latching means is otherwise constructed and operates in a conventional manner. For example, handle 226 may be turned to operate in a conventional manner a latch which selectively engages and disengages a tab (not shown) attached to the vehicle bed. This first releasable latching means provides for releasably latching the first cover member 218 in a position shown in FIG. 1 covering the front portion of the vehicle bed and, upon release, provides for moving the first cover member 218 longitudinally to the rear to expose the front portion of the vehicle bed, as shown in FIG. 2. A second conventional releasable latching means, of which the handle 228 is shown in FIGS. 1 and 2, is provided, affixed to the second cover member 220. Handle 228 may similarly operate a latch which selectively engages a latch on the vehicle bed to latch cover member 220 to the rear of the vehicle bed. Handle 228 is turned to disengage the latch from the tab and thereby enables the rear cover member 220 to be collapsed forwardly to expose the rear of the bed.

The cover members 218, 220, 222 and 224 engage the guide tracks 214 and 216 by means of support slide assemblies 66 that are constructed and operate in the manner shown in FIGS. 3 through 5. Support slide assemblies 66 are mounted to each of the cover members 218, 220, 222 and 224 adjacent the lateral sides thereof and engage respective guide tracks 214 and 216 conveniently in the manner illustrated in FIGS. 3 and 4. More particularly, each cover member has at least one slide assembly 66 mounted along each of its lateral sides, preferably proximate its rearward wall. Cover member 218 preferably may include an additional pair of slide assemblies mounted along its respective lateral walls proximate the forward wall of the cover member. FIGS. 3 through 5 illustrate a representative slide assembly 66 that is mounted to cover member 218 proximate its rearward wall 72 for engagement with left hand guide track 214. It is to be understood that in these preferred embodiments a pair of similar slide assemblies 66 are provided on each of the cover members, one each of the right and left hand sides respectively.

As shown in FIGS. 3 through 5, each slide assembly 66 is laterally adjustably mounted to cover member 218 by a bracket 68 formed from metal, plastic or other suitable material. Bracket 68 includes a first generally planar vertical portion 70 that is attached to an elongate lateral strip 71, which, in turn, is attached to the rearward wall 72 of cover 218, as shown in FIG. 5, by rivets 73 or other attachment means. Lateral strip 71 is preferably formed of a lightweight but rugged material such as aluminum and serves to reinforce rearward wall 72 of the cover member 218. Portion 70 of bracket 68 is attached to strip 71 by spot welding or other suitable fastening means. A second generally horizontally planar portion 74 of bracket 68 extends from the bottom edge of portion 70 in a generally perpendicular manner. This portion 74 comprises the portion providing the sliding support of the cover member in engagement with the upper surface of guide track 214, as shown in FIG. 3. Where the bracket 68 is formed of metal, it is preferable that this portion 74 be coated with a low friction material, such as Teflon, or the like. If the bracket 68 is formed of a low friction plastic, such coating may not be necessary. As best shown in FIGS. 3 and 5, an elongate transverse slot 75 is disposed in horizontal bracket portion 74. A third, generally vertical planar portion 76 extends generally perpendicularly from horizontal portion 74, and a fourth generally horizontal planar portion 78 extends generally perpendicularly from the upper edge of the vertical portion 76. Fastening means 84, suitably comprising rivets, secure horizontal bracket portion 78 to the lower surface of rib 85 formed in cover member 218.

The slide assembly 66 includes a disc shaped guide member 90, suitably formed of a substantially rigid, low-friction synthetic resin, such as nylon, Teflon, polyethylene or the like, that is slidably attached to bracket 68 by a mounting member 92, preferably in the form of a bolt, pin or other fastener. More particularly, as shown in FIGS. 3–5, bolt 92 extends through slot 75 in bracket portion 74 and is secured to bracket 68 by a nut 94. Preferably, nut 94 comprises a self-locking nut suitably having a locking insert that will not loosen as the nut vibrates. Guide member 90 is axially mounted on bolt 92 and, in particular, is seated on the head 96 of bolt 92. The guide member 90 and its fasteners 92 and 94 thus combine to form guide member assembly 95. Guide member 90 has a recessed portion 98 that accommodates bolt head 96 so that the bolt head extends only slightly, if at all, below slide member 90.

Guide member 90 is received within the guide track 214, preferably in the manner illustrated in FIGS. 3 and 4. In this embodiment, the guide track is in the form of a square or rectangular channel formed, for example, from PVC or another preferably rugged and relatively low friction material having a ribbed bottom and two full sides with partial top side, leaving open a slot 100 along the top through which a portion of slide assembly 66 extends. More particularly, guide member 90 is disposed completely within guide track 214 and bolt 92 extends upwardly through the slot 100 of guide track 214. Preferably, slide assembly 66 also includes a shoulder element 102, which may be integral with guide member 90 or, preferably, in the form of an additional disc on top of member 90. Shoulder element 102 is axially mounted on bolt 92 between the upper surface of guide member 90 and the bottom surface of bracket portion 74. Shoulder element 102 extends through the slot 100 of guide track 214 and spaces the guide member 90 from bracket 68.

Because guide member 90 is fully enclosed in guide track 214 and is preferably wider in the lateral direction than the width of slot 100, the slide assembly 66 is interlocked with its respective guide track 214 to prevent lifting away from the guide track 214 of the cover member 218 to which slide assembly 66 is attached, effectively capturing the slide assembly and the cover member. With guide member 90 received in guide track 214, and a comparable guide member received within guide track 216, the slide assemblies 66, and, therefore, the cover member 218 are allowed to slide longitudinally along the guide tracks 214 and 216. Both guide member 90 and shoulder 102 may be axially rotatable about bolt 92 to facilitate rolling movement along guide tracks 214 and 216. This is not a limitation of the invention, however, and in alternative embodiments the guide member 90 and shoulder 102 may be non-rotatable. Additionally, these elements may have alternative shapes that are non-circular.

The provision of upwardly extending ribs 104 of the base of the guide track 214 (and correspondingly on guide track 216) forms channels in the lowermost portion of the guide track 214 so that small debris, such as sand, may fall into those channels, and also provides for clearance of screws such as 106 used to mount the guide track to the vehicle bed.

Sufficient clearance is provided between bolt 92 and the longitudinal edges of slot 75 and sufficiently low-friction is encountered between the upper surface of shoulder 102 and the bottom surface of bracket portion 74 so that bolt 92 is slidable within transverse slot 75. As a result, guide member assembly 95 may be adjusted laterally relative to the cover assembly by slidably adjusting member 90 along the slot 75 in bracket 68 in the direction of double-headed arrow 108, shown in FIG. 5. Thus, each bracket 68 and its slot 75 may serve as guide means for transverse adjustment of the position of its respectively engaged guide member assembly 95. As best shown in FIG. 3, preferably sufficient clearance is provided between nut 94 and shoulder 102 so that the guide member 90 slides freely along the guide. Because each guide member 95 is adjustably positionable within its respective guide means, each cover member, such as cover member 218, may be mounted to vehicle bed having differing widths.

Before cover member 218 is attached to the vehicle bed, each guide member assembly 95 is laterally adjusted by moving it along its respective slot 75 in its respective bracket 68 as required in the direction of double-headed arrow 108 until the distance between the left hand and right hand slide assemblies corresponds to the distance between guide tracks 214 and 216. When the correct position is determined the cover assembly is simply slid onto the guide tracks. This attachment can be made quickly and conveniently without having to detach the guide member and reattach it at a different position on the cover member for each particular vehicle bed width. As a result, a considerable degree of labor is saved. Moreover, pre-marked or pre-drilled positioning holes do not have to be formed in each cover member. The single adjustable assembly accommodates numerous widths. A further advantage to this invention is that the installation of the guide tracks 214 and 216 requires much less precision. If the track is installed in a distorted manner, the adjustable slide assembly 66 self adjusts when encountering the distortion by sliding the bolts 92 as required in the direction of arrow 108 within the slots 75. As a result, the slide assembly remains engaged with the guide track, and the cover member remains securely fastened to the sides of the vehicle bed.

The transverse guide bracket 68 is typically constructed of a sturdy synthetic or metal material. For example, a preferred construction may employ aluminum which is dipped in nylon or Teflon coating so that the slide assembly 66 may move easily within the guide means without binding or rattling.

While the foregoing has described particular preferred embodiments of the vehicle bed of this invention, it is to be understood this description is illustrative only of the principles of this invention and is not to be considered limitative thereof. Because numerous variations and modifications of this apparatus, all within the scope of the invention, will readily occur to those skilled in the art, the scope of this invention is to be determined solely by the claims appended hereto.

What is claimed is:

1. A telescoping cover assembly for a vehicle bed, comprising
a plurality of substantially rigid cover members, each extending transversely beyond the longitudinal edges of the lateral sides of said vehicle bed and each being longitudinally moveable relative to another and each overlapping a longitudinally adjacent said cover member, with a first said cover member being releasably fixable in a position covering one end of said vehicle bed and a second cover member being releasably fixed in a position covering the rear end of said vehicle bed;

a pair of guide tracks, one each affixed to said vehicle adjacent and longitudinally parallel to each lateral side of said vehicle bed for guiding said longitudinal movement of said cover members;

at least two support slide assemblies carried by each said cover member, with at least one of said support slide assemblies engaging each respective said guide track to provide sliding support for said longitudinal movement of said cover member, each said support slide assembly including a guide member assembly that is engagable with a respective guide track for traveling longitudinally along said guide track, and means for laterally adjustably mounting said guide member to said cover member, whereby each guide member assembly may be laterally adjusted for engagement with a respective said guide track.

2. The cover assembly of claim 1 wherein said means for laterally adjustably mounting include transverse guide means attached to said cover means, each said guide member assembly being engageable with said guide means for moving transversely relative to said cover means.

3. The cover assembly of claim 2 wherein each said guide means include an elongate transverse slot in a bracket attached to said cover member for receiving said one guide member assembly and allowing said one guide member assembly to slide longitudinally in said slot.

4. The cover assembly of claim 3 wherein said means for laterally adjustably mounting further include means for attaching said one guide member assembly to said transverse guide means and allowing said guide member assembly to slide longitudinally in said slot.

5. The cover assembly of claim 3 wherein said one guide member assembly includes
   a guide member that is engageable with said guide track, and
   a mounting member that carries said guide member and is receivable by said slot and is longitudinally slidable therein.

6. The cover assembly of claim 5 wherein said guide member is generally disk shaped having an axis of rotation extending generally vertically therethrough.

7. The cover assembly of claim 6 wherein said guide member is attached to said transverse guide means for rotation about said axis relative to said transverse guide means.

8. The cover assembly of claim 5 further comprising a shoulder element carried by said mounting member and disposed between said guide member and said transverse guide means to space said guide member from said guide means.

* * * * *